US011284133B2

(12) United States Patent
Zhang

(10) Patent No.: US 11,284,133 B2
(45) Date of Patent: Mar. 22, 2022

(54) REAL-TIME VIDEO CODING SYSTEM OF MULTIPLE TEMPORALLY SCALED VIDEO AND OF MULTIPLE PROFILE AND STANDARDS BASED ON SHARED VIDEO CODING INFORMATION

(75) Inventor: Lei Zhang, Palo Alto, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 994 days.

(21) Appl. No.: 13/545,261

(22) Filed: Jul. 10, 2012

(65) Prior Publication Data

US 2014/0016693 A1 Jan. 16, 2014

(51) Int. Cl.
| | |
|---|---|
| H04N 21/2343 | (2011.01) |
| H04N 19/31 | (2014.01) |
| H04N 19/513 | (2014.01) |
| H04N 19/187 | (2014.01) |
| H04N 19/196 | (2014.01) |
| H04N 19/107 | (2014.01) |
| H04N 19/56 | (2014.01) |

(52) U.S. Cl.
CPC ..... *H04N 21/23439* (2013.01); *H04N 19/107* (2014.11); *H04N 19/187* (2014.11); *H04N 19/197* (2014.11); *H04N 19/31* (2014.11); *H04N 19/513* (2014.11); *H04N 19/56* (2014.11); *H04N 21/2343* (2013.01); *H04N 21/234381* (2013.01)

(58) Field of Classification Search
None
See application file for complete search history.

(56) References Cited

U.S. PATENT DOCUMENTS

| | | |
|---|---|---|
| 6,011,901 A | 1/2000 | Kirsten et al. |
| 6,496,216 B2 | 12/2002 | Feder et al. |
| 6,535,238 B1 | 3/2003 | Kressin |
| 6,538,656 B1 | 3/2003 | Cheung et al. |
| 6,573,905 B1 | 6/2003 | MacInnis et al. |
| 6,614,843 B1 | 9/2003 | Gordon et al. |
| 6,636,222 B1 | 10/2003 | Valmiki et al. |
| 6,661,422 B1 | 12/2003 | Valmiki et al. |
| 6,757,005 B1 | 6/2004 | Elbaz et al. |

(Continued)

FOREIGN PATENT DOCUMENTS

| | | |
|---|---|---|
| EP | 1 615 447 A1 | 1/2006 |
| EP | 1 711 018 A1 | 10/2006 |
| GB | 2459684 A1 | 11/2009 |

OTHER PUBLICATIONS

ITU-T H.264 (Jan. 2012).*

(Continued)

*Primary Examiner* — Stuart D Bennett
(74) *Attorney, Agent, or Firm* — Foley & Lardner LLP

(57) ABSTRACT

In one embodiment, a method comprising receiving at a single encoding engine an input video stream according to a first version of a video characteristics, such as frame rate, profile and level, and coding standard, and generating by the single encoding engine, in parallel, a plurality of streams comprising a first encoded stream according to a first version of the video characteristic and a second encoded stream according to a second version of the video characteristic, the second encoded stream generated based on video coding information used to generate the first encoded stream.

17 Claims, 7 Drawing Sheets

(56) References Cited

U.S. PATENT DOCUMENTS

| | | |
|---|---|---|
| 6,768,774 B1 | 7/2004 | MacInnis et al. |
| 6,798,420 B1 | 9/2004 | Xie |
| 6,853,385 B1 | 2/2005 | MacInnis et al. |
| 6,870,538 B2 | 3/2005 | MacInnis et al. |
| 6,871,006 B1 | 3/2005 | Oguz et al. |
| 6,975,324 B1 | 12/2005 | Valmiki et al. |
| 7,058,965 B1 | 6/2006 | Gordon et al. |
| 7,071,944 B2 | 7/2006 | MacInnis et al. |
| 7,085,322 B2 | 8/2006 | Ngai et al. |
| 7,110,006 B2 | 9/2006 | MacInnis et al. |
| 7,230,987 B2 | 6/2007 | Demas et al. |
| 7,256,790 B2 | 8/2007 | Valmiki et al. |
| 7,274,740 B2 | 9/2007 | van Beek et al. |
| 7,277,099 B2 | 10/2007 | Valmiki et al. |
| 7,313,593 B1 | 12/2007 | Pulito et al. |
| 7,365,752 B2 | 4/2008 | Xie |
| 7,446,774 B1 | 11/2008 | MacInnis et al. |
| 7,533,402 B2 | 5/2009 | Demas et al. |
| 7,555,715 B2 | 6/2009 | Randall et al. |
| 7,613,727 B2 | 11/2009 | Visharam et al. |
| 7,626,518 B2 | 12/2009 | Hussain et al. |
| 7,626,521 B2 | 12/2009 | Hussain et al. |
| 7,656,326 B2 | 2/2010 | Hussain et al. |
| 7,659,900 B2 | 2/2010 | MacInnis et al. |
| 7,667,715 B2 | 2/2010 | MacInnis et al. |
| 7,809,061 B1* | 10/2010 | Sarna ............ H04N 21/234327 375/240.16 |
| 7,848,430 B2 | 12/2010 | Valmiki et al. |
| 7,921,445 B2 | 4/2011 | Amir et al. |
| 7,991,049 B2 | 8/2011 | MacInnis et al. |
| 8,018,850 B2 | 9/2011 | van Beek et al. |
| 8,022,966 B2 | 9/2011 | MacInnis et al. |
| 8,050,330 B2 | 11/2011 | Demas et al. |
| 8,102,916 B1 | 1/2012 | Masterson et al. |
| 8,189,678 B2 | 5/2012 | Valmiki et al. |
| 2003/0074445 A1* | 4/2003 | Roach ............... H04L 69/16 709/224 |
| 2006/0013305 A1* | 1/2006 | Sun .................. H04N 19/172 375/240.12 |
| 2006/0165301 A1* | 7/2006 | Cha .................. H04N 19/105 382/240 |
| 2007/0286284 A1* | 12/2007 | Ito ..................... H04N 19/51 375/240.16 |
| 2009/0154562 A1 | 6/2009 | Syed et al. |
| 2010/0086029 A1* | 4/2010 | Chen ................. H04N 19/176 375/240.12 |
| 2010/0098161 A1* | 4/2010 | Mizoguchi ..... H04N 21/234381 375/240.13 |
| 2010/0124274 A1* | 5/2010 | Cheok ............... H04N 19/176 375/240.03 |
| 2011/0234894 A1* | 9/2011 | Van Eggelen ......... H04N 7/01 348/441 |
| 2012/0020413 A1* | 1/2012 | Chen ................. H04N 19/597 375/240.26 |
| 2013/0170561 A1* | 7/2013 | Hannuksela ..... H04N 21/23424 375/240.25 |
| 2013/0322538 A1* | 12/2013 | Seregin ................ H04N 19/52 375/240.16 |

OTHER PUBLICATIONS

ITU-T H.264 (Jan. 2012) (Year: 2012).*
Office Action for Korean Patent Application No. 1020130076137 dated Jul. 24, 2014 (including English summary).
Communication Pursuant to Article 94(3) EPC for European Patent Application No. EP 13003207, dated Apr. 10, 2014, 6 pages.
Jeongnam Youn et al., "Motion Vector Refinement for High-Performance Transcoding", IEEE Transactions on Multimedia, IEEE Service Center, Piscataway, NJ, US, vol. 1, No. 1, Mar. 1, 1999, 11 pages.
Ishfaq Ahman, et al., "Video Transcoding: An Overview of Various Techniques and Research Issues", IEEE Transactions on Multimedia, vol. 7, No. 5, Oct. 2005, pp. 793-804.
European Search Report in co-pending, related EP Application No. 13003207.1, dated Nov. 20, 2013.
EP Examination Report for EP Application No. 13003207.1 dated Dec. 9, 2014.
Taiwanese Office Action for Taiwan Application No. 102122731 dated Mar. 25, 2015 (including English summary).
Office Action for Chinese Patent Application No. 2013102703098 dated Feb. 2, 2016 (including English summary).
Office Action for Chinese Application No. 201310270309.8, dated Nov. 2, 2016, 11 pages.
Office Action for Chinese Application No. 201310270309.8, dated Mar. 2, 2017, 10 pages.

* cited by examiner

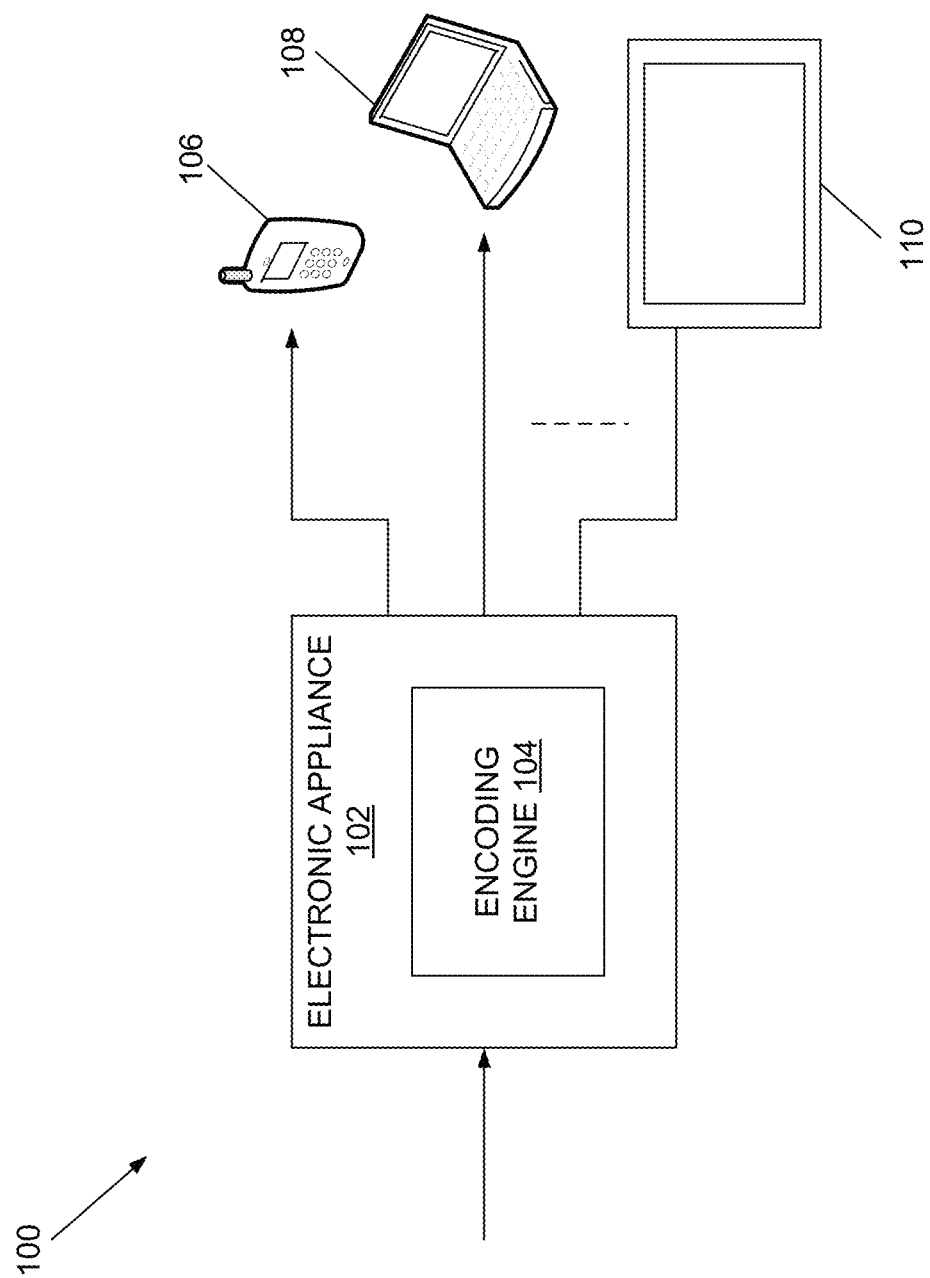

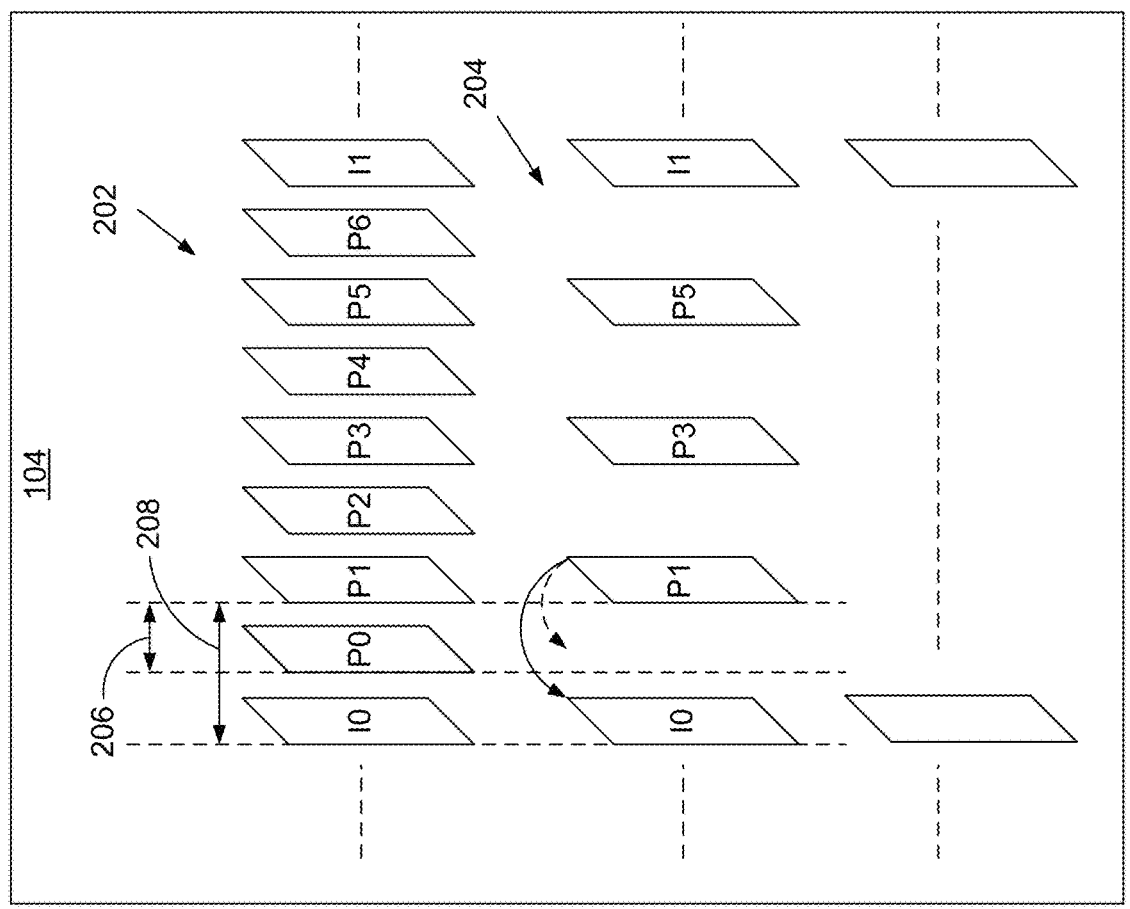
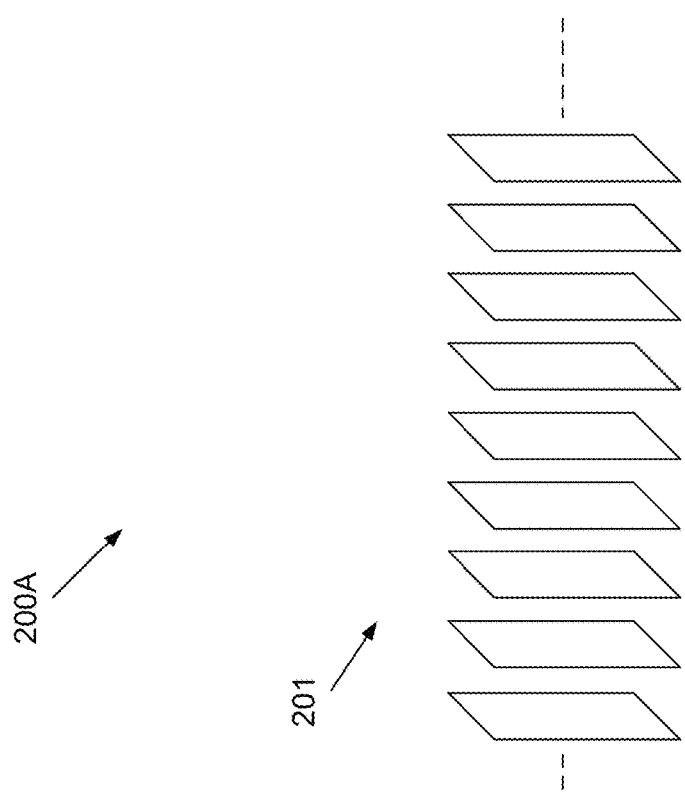
FIG. 2A

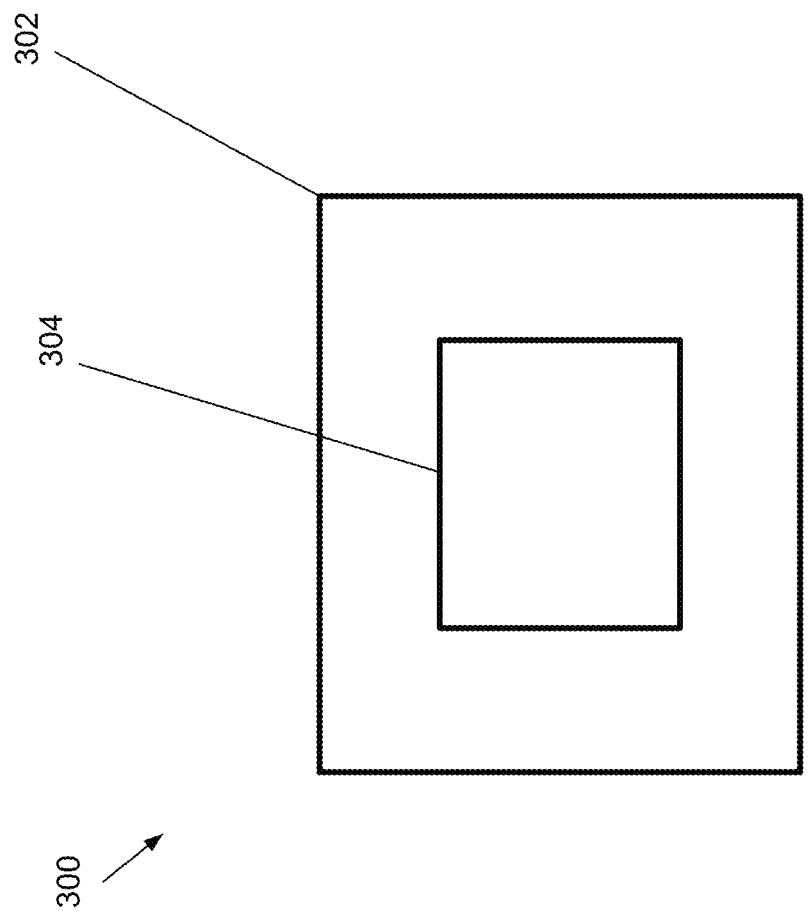

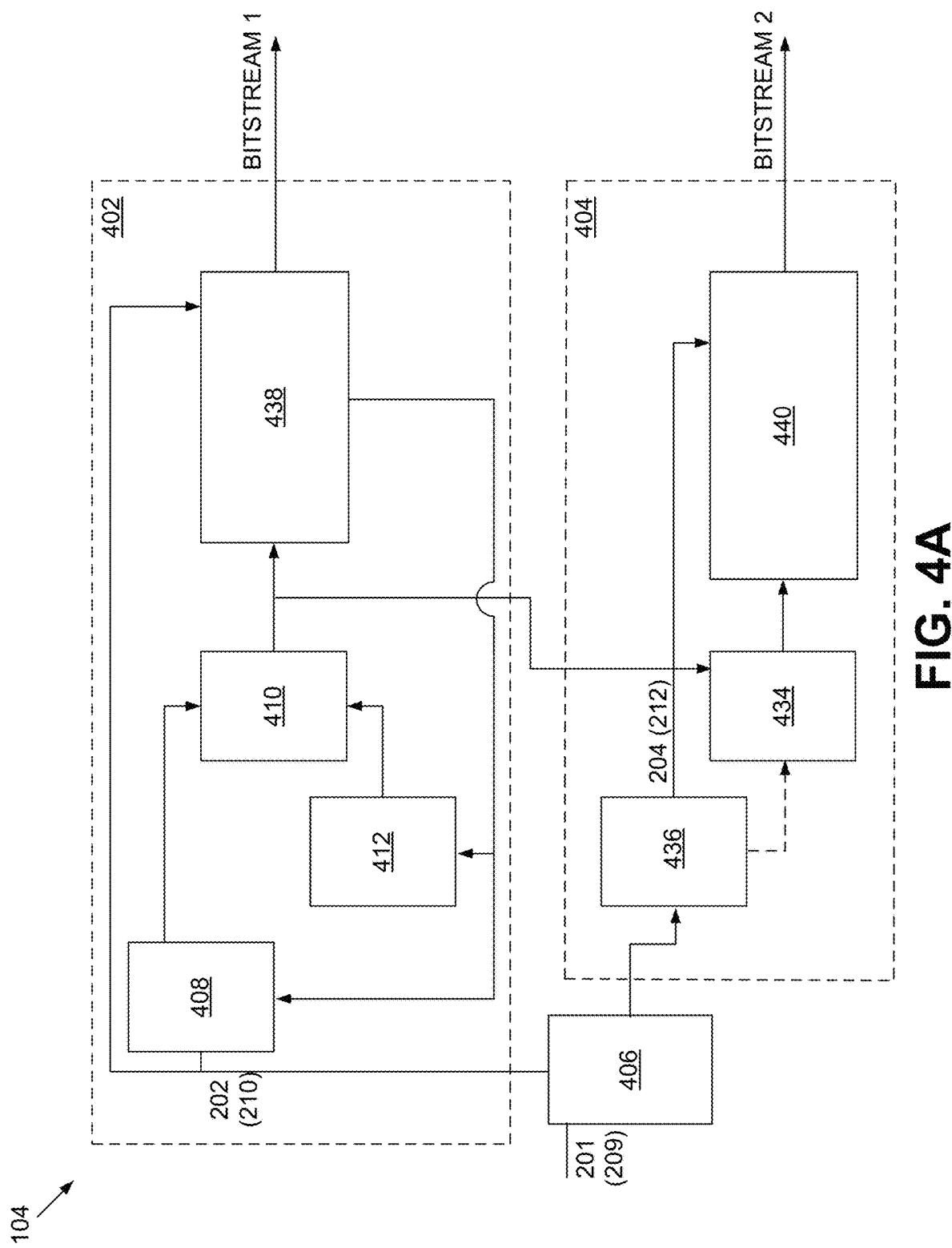

REAL-TIME VIDEO CODING SYSTEM OF MULTIPLE TEMPORALLY SCALED VIDEO AND OF MULTIPLE PROFILE AND STANDARDS BASED ON SHARED VIDEO CODING INFORMATION

CROSS-REFERENCE TO RELATED APPLICATIONS

This application is related to copending U.S. utility patent application entitled "Systems and Methods for Generating Multiple Bitrate Streams Using a Single Encoding Engine," filed on May 31, 2012 and accorded Ser. No. 13/484,478, and copending U.S. utility application entitled, "Real-Time Encoding System of Multiple Spatially Scaled Video Based On Shared Video Coding Information," filed on the same date as the present disclosure.

TECHNICAL FIELD

The present disclosure is generally related to video encoding/transcoding.

BACKGROUND

Advances in video technology have led to a multitude of mechanisms by which a consumer may receive and enjoy video (and audio) presentations. For instance, a signal may be received at an electronic appliance at a home or place of business via satellite or cable, and distributed as a high bit rate, high definition (HD) stream for viewing in one room over a multimedia over coax alliance (MoCA) network, or as a low bit rate stream for viewing on a portable device over wireless, or as streaming content to another client device for place-shifted viewing over the Internet. Various approaches to achieving these functions continue to evolve as technology improves.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a block diagram of an example environment in which an embodiment of a video coding system may be employed.

FIGS. 2A-2B are schematic diagrams that illustrate the generation of video streams of different frame rates from an input video stream and the alternative selection of reference pictures that are not available in the reduced frame rate stream.

FIG. 3 is a block diagram that illustrates one embodiment of an example motion search range of different video coding standards or different coding profiles of the same coding standard in one embodiment of an encoding engine.

FIGS. 4A-4B are block diagrams that illustrate certain embodiments of an example encoding engine.

DETAILED DESCRIPTION

Figure 2B:
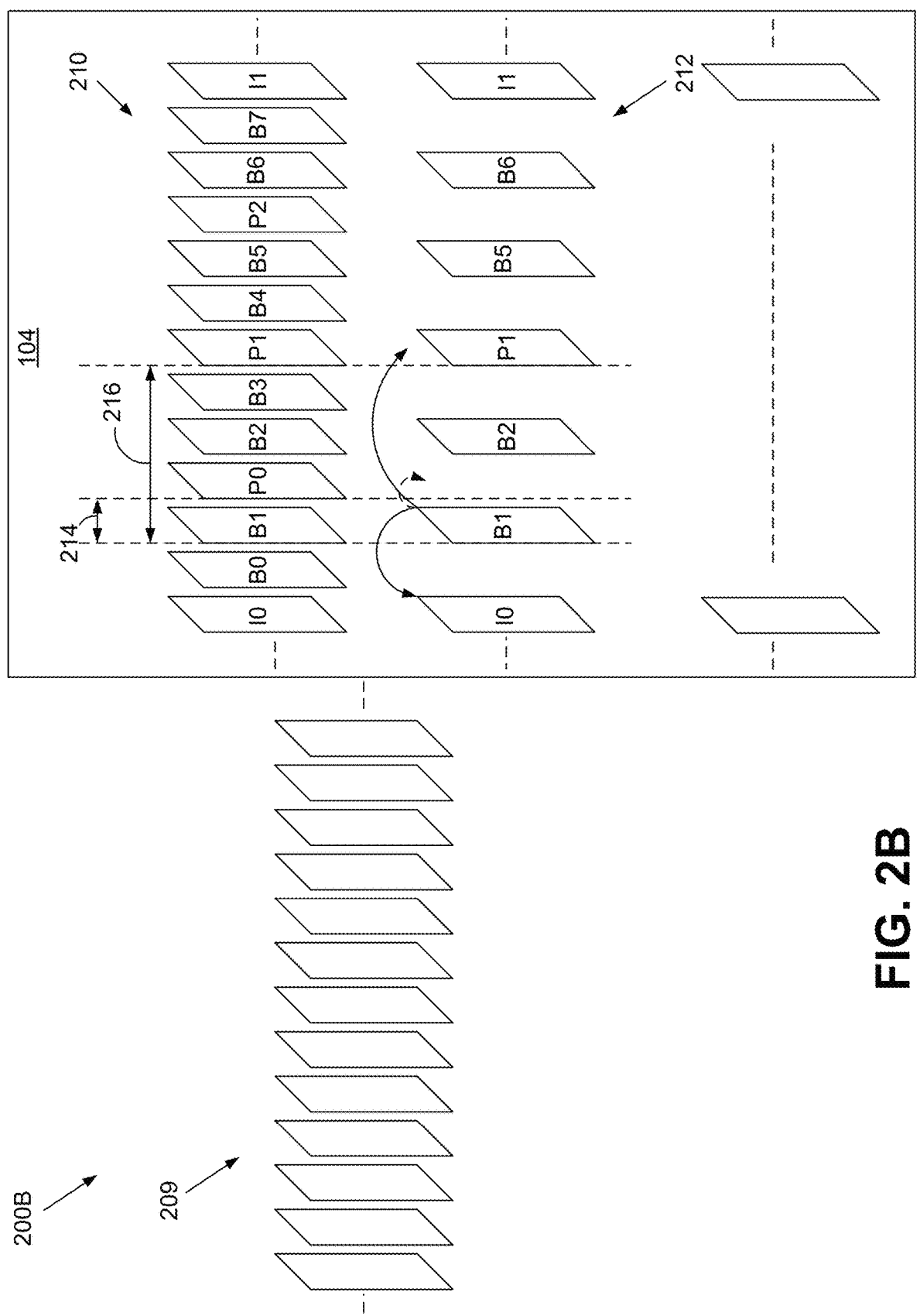

Disclosed herein are certain embodiments of video coding systems and methods that include a single encoding engine that shares video coding information among plural, real-time, parallel encoding operations to provide multiple encoded streams. The video coding information includes motion vector search results (e.g., motion vectors, partitions of one coding unit or one macroblock, motion vector search range, etc.) and in some embodiments, mode decisions, such as inter or intra prediction mode for the coding unit or macroblock, and intra prediction direction if intra prediction is selected for the coding unit or macroblock. Note that a coding unit refers to a basic coding unit in the emerging HEVC video compression standard, and that a macroblock refers to a basic coding unit in MPEG-2, AVC, VC-1, and VP8 video compression standards, as should be appreciated by one having ordinary skill in the art. Macroblock and coding unit are two terms that are used interchangeably herein. Reference herein to encoding includes encoding (e.g., based on receipt of a non-compressed stream) and transcoding (e.g., based on receipt of a compressed stream and compression operations with or without decompression).

In one embodiment of a video coding system corresponding to different frame rates (e.g., frame rate, also referred to herein as picture rate, being one example video characteristic), a single encoding engine is used to generate one or more compressed streams of the original high frame-rate input video and one or more lower frame-rate video than the original input video in real-time by sharing the motion vector search result for inter-prediction and/or sharing a mode decision for both inter and intra prediction when encoding videos of the lower frame-rate from the same input.

In one embodiment of a video coding system corresponding to multiple profiles and levels (e.g., profiles and levels being another example video characteristic), a single encoding engine is used to generate compressed streams of different profiles and levels in real-time by sharing the motion vector search result for inter-prediction and/or sharing the intra mode decision for intra prediction, and/or the selection between inter or intra prediction for the coding unit or macroblock when encoding videos of different profiles and levels from the same input.

In conventional systems, multiple instances of the same encoding engine may be employed to support encoding of both the original input video and the lower frame rate or different profiles and levels version of the input video in parallel in real-time, which may increase the silicon cost, or encoding the original input video and the lower frame rate or different profiles and levels version by the same encoding engine at a speed of multiple of the real-time video rate, which increases the circuit clock rate and power consumption. Motion vector searching is one of the functions that consume most processing resources as well as the DRAM bandwidth cost, whether it is implemented in hardware or software. It is also one of the functions that may affect the coding quality significantly if the search range is not sufficient. Sharing the motion search results among the same video of different sizes, different frame rates, or different profiles, as performed by certain embodiments of video coding systems, may save silicon and DRAM cost. Further, the generation of a plurality of different encoded streams at different frame rates and/or profiles and/or levels is accomplished in certain embodiments of video coding systems without increasing the speed beyond the real-time video rate of the input video.

Having summarized features of certain embodiments of video coding systems, reference will now be made in detail to the description of the disclosure as illustrated in the drawings. While the disclosure will be described in connection with these drawings, there is no intent to limit it to the embodiment or embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring to FIG. 1, shown is a block diagram of an example environment in which an embodiment of a video coding system may be employed. One having ordinary skill in the art should appreciate in the context of the present disclosure that other systems where encoding may be utilized are contemplated, and hence FIG. 1 is merely for illustrative purposes, with other variations contemplated to be within the scope of the disclosure. The environment depicted in FIG. 1 comprises a home entertainment system 100 comprising an electronic appliance 102, an encoding engine 104 embedded within the electronic appliance 102, and a plurality of multi-media devices, including a smartphone 106, a laptop 108, and a television 110. In one embodiment, the electronic appliance 102 is configured as a home media gateway set-top box, where the same input video from cable or satellite (or terrestrial) is encoded by the single encoding engine 104 to different bit rates simultaneously in real-time, such as a high bit rate, high definition (HD) stream for viewing on the television 110 in a bedroom over MoCA and a low bit rate stream for a portable device(s) (e.g., smartphone 106, cell phone, PDA, etc.) over wireless, and/or streaming to another client (e.g., the laptop 108) for place-shifted viewing over the Internet. In some embodiments, the electronic appliance 102 may be embodied as a server device, router, computer, television, among other electronic devices.

The low bit rate stream may be a lower valued video characteristic than the original input video provided to the input of the electronic appliance 102 (e.g., lower frame rate, such as a stream at half of the frame rate of the original input, or different profile and level, such as a lower level 2.1 versus level 3.1 in the AVC/H.264 video coding standard). The description that follows commences with embodiments involving video characteristics pertaining to the use of different frame rates, with certain embodiments addressing other video characteristics to follow. Multiple frame-rate streams of the same video content are particularly useful in a heterogeneous video consumption environment. For instance, with multiple screens, ultra high quality video such as a live sports game at 1080p60 may be viewed in the big screen 110 in a living room, and in the meantime, the same game at 1080p30 can be viewed in a portable device (e.g., smartphone 106, iPAD, etc.) in a kitchen or in the backyard via WiFi using a home wireless router, or can be viewed at 1080p30 on a display screen in a vehicle via a 3G/4G wireless IP network when a user may have to drive away in the middle of the game while his or her family may still watch the game at home. A seamless consumption of the same video content on multiple screens at different places at the same time may require the real-time encoding engine 104 to generate multiple frame rate video streams with the same input video at the same time.

The real-time multi-rate video encoding engine 104 also has one or more applications in wireless video display, such as video-over-WiFi or video-over-WiGig, where the available bandwidth for a video transmission rate may change very quickly due to possible blockage of the transmission path between a transmitter and a receiver by a moving object.

Certain embodiments of a video coding system may provide a benefit to the quality of video services if the transmitter that normally comprises, for instance, the video encoding engine 104, generates both high and low bit rate streams. The low bit rate stream may be the same video at a lower frame rate than the original input stream, and thus meets a lower transmission rate when the available bandwidth drops.

The real-time, multiple frame-rate video encoding engine 104 (e.g., which generates multiple compressed video streams in real-time with the same input video) may be attractive because display devices with a video frame rate converter appear to be a popular feature where a low frame rate stream may be converted to a high frame rate when displaying on the screen.

Although emphasis has been placed above on applications and/or features/benefits involved in using different frame rates, the ability to render different profile and level streams also has numerous applications with benefits that may inure to the consumer and are contemplated here. For instance, the application of a set-top box to stream the same video content to multiple screens at the same time is emerging as an important feature. Different screens may require the set-top box to transmit the same video content of not only different bit rates, frame rates, and/or picture sizes, but also different profiles and levels. That is, different video display devices may have diverse decoding capabilities, so that each device may support selected profiles and levels even for the same coding standard. For example, a portable device such as the iPad may support AVC profile/level 4.2 while a mobile phone may only support AVC profile/level 3.2. The real-time multi-rate video encoding engine 104 may need to generate multiple compressed video streams in real-time at different profiles and levels with the same input video at the same time.

In the description that follows, various embodiments of video coding methods involved with providing multiple encoded streams that differ in example video characteristics (e.g., frame rate and profile and levels) are disclosed in conjunction with the illustrations in FIGS. 2A-2B (frame rate) and FIG. 3 (motion search range of different profiles and levels or coding standards). It should be appreciated within the context of the present disclosure that certain embodiments of video coding systems may employ one or any combination of these methods.

Referring now to FIGS. 2A-2B, shown are some example video coding methods that involve providing multiple encoded streams of different frame rates. In one embodiment of a video coding method, when a low frame-rate video is encoded by sharing motion search results with the stream coded at the original (e.g., as received at a given electronic appliance) input video frame rate, the motion search is performed in the video of the original input frame rate. For example, the frame rate of the original input video may be 1920×1080 at 60 frames per second (e.g., 1080p60), and the lower frame rate video may be 1920×1080 at 30 frames per second (e.g., 1080p30). In this example, the motion search is performed in coding the 1080p60 video, and the motion vectors of coding the 1080p30 video are derived from those of the 1080p60 video without conducting its own motion search. How the motion vectors of a lower frame rate video are derived depends on a GOP (Group of Pictures) structure. In one embodiment, the video coding methods facilitate motion vector derivation by selecting an intra period of the GOP to be an even number of pictures, which enables the same picture in the video sequence to be selected as an intra picture (intra coded or I picture) in both 1080p60 and 1080p30 streams, and which further enables the intra picture distance in 1080p30 to be half of that in 1080p60.

As one example, attention is directed to the diagram 200A in FIG. 2A, which illustrates an uncompressed input video stream 201 provided to the input of the encoding engine 104 and the generation of two video streams 202 and 204 (each illustrating one GOP sequence) that exhibit a difference in picture rate. Note that the terms "pictures" and "frames" are used interchangeably in the disclosure for the sake of brevity. The same idea is applicable to the video of interlaced format where "field" is a basic unit of a picture. Assume for purposes of illustration that the generated video stream 202 corresponds to a GOP for 1080p60 video, and that the other generated video stream 204 corresponds to a GOP for 1080p30 video. Note that additional video streams may be generated in the encoding engine 104, as represented by the horizontal dashed line with a portion of the pictures shown beneath video stream 204. As shown in this example, the selected GOP in the 1080p60 video 202 is "I0P0P1P2P3P4P5P6I1" (in displaying order). The GOP in the 1080p30 video 204 is selected by the video coding system as "I0P1P3P5I1" (likewise in displaying order). If the selected P picture in the 1080p30 video 204 uses a reference which is not one of the pictures in the 1080p30 video sequence (e.g., is absent from the 1080p30 video 204), for example where P1 uses P0 as a reference in the 1080p60 sequence while P0 is not one of pictures in the 1080p30 sequence (as represented by the dashed reference arrowhead from P1 to the absent P0), P1 uses its preceding reference picture (e.g., I0 picture, as represented by the solid reference arrowhead from P1 to I0) as its reference in the 1080p30 video 204. The motion vectors of P1 to P0 in the 1080p60 video 202 are scaled to the P1 to I0 picture reference in the 1080p30 video 204 by the ratio of temporal distance 208 between P1 and I0 and a temporal distance 206 between P1 and P0. In this example, if the temporal distance 206 between P1 and P0 is one unit, then the temporal distance 208 between P1 and I0 is two units, and the motion vectors are scaled by a factor of two. If the selected P picture in the 1080p60 video 202 uses a reference which is still one of the pictures in the 1080p30 video 204, for example where P1 uses I0 as a reference while I0 is still one of the pictures in the 1080p30 video 204, the same motion vectors of P1 to I0 may be used in the 1080p30 video sequence without scaling.

In yet another example in the context of 1080P60 and 1080P30 video, depicted in diagram 200B of FIG. 2B, assume a non-compressed input video 209, and the selected GOP in a 1080p60 video 210 is "I0B0B1P0B2B3P1B4B5P2B6B7I1" and the selected GOP in the 1080p30 video 212 is "I0B1B2P1B5B6I1." As noted by the horizontal dashed line with a portion of pictures located beneath the video stream 212, in some embodiments, additional streams may be generated. If the selected B picture in the 1080p30 video 212 uses a reference which is not one of the pictures in that stream 212, for example where B1 uses I0 (reference depicted as a solid arrowhead) and P0 as two references for bi-prediction, while P0 is no longer in the 1080p30 sequence 212 (as represented by the dashed reference arrowhead), the selected B picture uses its nearest neighboring I or P pictures as its references (e.g., I0 and P1, each represented with solid reference arrowheads) for the B1 inter prediction. Because P1 is not a reference of B1 in the 1080p60 video 210, the motion vectors of B1 to P1 are derived by scaling the motion vectors of B1 to P0 by the ratio of a temporal distance 216 between B1 and P1 and a temporal distance 214 between B1 and P0. In this example, if the temporal distance 214 between B1 and P0 is one unit, then the temporal distance 216 between B1 and P1 is four units, and the motion vectors between B1 and P1 are derived by scaling those between B1 and P0 by a factor of four.

After the motion vectors are found in the 1080p30 video 212, motion compensation and other processing functions such as transform, quantization, inverse quantization, inverse transform, reconstruction, loop filter, and entropy coding may be performed for the 1080p30 video 212 independent of the 1080p60 video 210, such as to prevent any drifting. Note that in the above example, the reconstructed picture P1 used in the 1080p30 inter prediction is different from that used in the 1080p60 inter prediction.

The above example video coding methods may be applied in some embodiments to encoding video at a frame rate of different temporal downscale factors. When the temporal downscale factor is not an even number, the intra period of the selected GOP may be a multiple of the temporal downscale factor. In some embodiments, the intra period of the selected GOP may not be a multiple of the temporal downscale factor and the intra pictures of different frame rates are not aligned. In this latter case, the video at a lower frame rate may have its own intra mode decision block and select its own intra picture in lieu of an inter predicted picture in the GOP of the original video. The intra mode decision block normally does not access DRAM and consumes insignificant silicon area or power. In some embodiments, the scaled motion vectors in the lower frame rate video may also be refined by performing a refinement search within a small search range.

As to partitions for purposes of inter prediction, in one embodiment, the partitions of the inter prediction of the lower frame rate may retain those used in for the higher frame rate. In some embodiments, the intra prediction mode decision of each coding unit or macroblock may also be shared between the low frame rate and high frame rate video when they share the same intra picture. For instance, in an AVC codec, a P or B picture may also have a macroblock that is coded by the intra mode. The decision of inter or intra for each macroblock may also be shared by the low frame-rate and high frame-rate video.

In some embodiments, the motion search sharing scheme may be extended to a real-time scalable video encoder, where different temporal layers may be encoded in real-time by the same encoder (e.g., encoding engine 104). The motion search results of the enhanced layer may be used to generate the motion vectors for the base layer, which is of a lower frame rate.

In some embodiments, the motion search sharing scheme may be applied to a real-time 3D video encoder, where multiple views may be encoded in real-time by the same encoder. The result of a motion search of one view may be shared by a neighboring view in a multi-view encoding approach to 3D video.

Having described certain embodiments of a video coding method pertaining to video characteristics of picture rate, attention is now directed to FIG. 3 in association with a discussion of certain video coding methods pertaining to different profiles and levels and/or coding standards. Although different profiles and levels may have different maximum allowed frame rates, maximum allowed picture sizes, and/or maximum allowed motion search ranges, to limit the implementation cost for different applications while achieving operational compatibility between encoders and decoders from different manufactures, there are some common sets of tools that are applicable to all profiles and levels. For example, the intra prediction modes are the same for all AVC profiles and levels. The hardware and/or software implementation of the intra prediction mode decision may be shared when generating AVC streams of different profiles and levels.

In another example, the vertical motion vector ranges are different for different AVC profiles and levels, such as [−256, +255.75] for the AVC level 2.1 to 3 and [−512, +511.75] for the AVC level 3.1 and above, as illustrated by the corresponding motion vector ranges 304 and 302 in diagram 300 of FIG. 3. In one embodiment, a video coding method may use the common set of the vertical motion vector range for all target AVC profiles and levels to be generated by the encoder, such as motion vector range 304 (e.g., [−256, +255.75]) when generating both AVC level 3 and 4.2 streams. In some embodiments, a video coding method may also apply a subset of the motion search results to the stream of lower profile when the motion search covers a larger range for the stream of higher profile. In this example, the motion search finds the best motion vector in the motion vector range 302 (e.g., [−512, +511.75]) for the AVC level 3.1 and above, and finds the best motion vector of the smaller range 304 for the AVC level 2.1 to 3 during the same search operation. The motion search may be performed in either the high or the low profile/level encoding path for the first approach (e.g., common set) while it is performed in the high profile/level encoding path for the second approach (e.g., subset).

In yet another AVC example, the minimum luma bi-prediction size is limited to 8×8 for the level of 3.1 and above while no limitation for the level below. The motion search may limit the minimum luma bi-prediction size to 8×8 while generating streams of the level 3.1 or above and the level 3 and below (e.g., common set).

In the example of an AVC encoder, a P or B picture may also have a macroblock that may be coded by the intra mode. In some video coding method embodiments, the decision of inter or intra for each macroblock may also be shared by both the low and the high profile/level. For the intra prediction, all AVC profiles and levels may share the same intra mode decision for no profile or level specific limitations.

Because the target maximum bit rate may be different for different profiles and levels, the other coding parameters or tools may not be shared by encoding paths of different profiles and levels. For example, the quantization parameters may be different and the resulting reconstructed pictures may be different. In general the other functions may not be shared.

In some embodiments, the above video coding methods involving profiles and levels and motion search and mode decision sharing schemes may be applied to encoding the multiple streams of different profiles and levels of any video coding standard, including the emerging HEVC or H.265, among others, where multiple profiles and levels may be defined for targeting different applications. In some embodiments, the above video coding methods pertaining to profiles and levels and motion search and mode decision sharing schemes may also be extended to encoding multiple streams of different video standards, where there is a common set of motion search parameters, such as motion vector range, that can be shared by both video coding standards. In this case, a common coarse motion vector may be searched using the same implementation block before it is refined for different coding standards according to different partition restrictions of the respective standard.

Figure 4B:
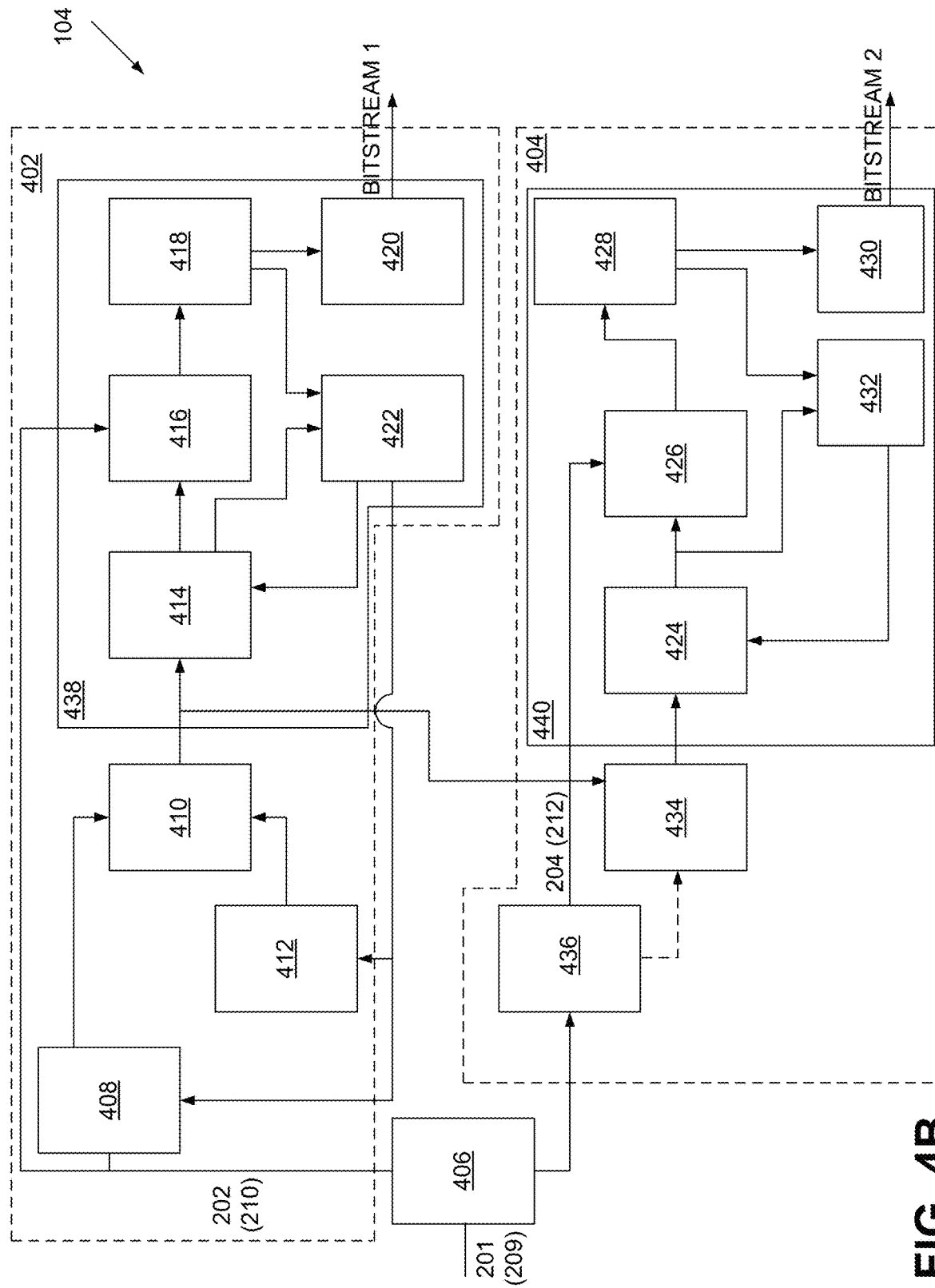

Attention is now directed to FIGS. 4A-4B, which illustrate an example video coding system embodied as a single encoding engine 104. In one embodiment, the single encoding engine 104 may be implemented in hardware, although some embodiments may include software (including firmware) or a combination of software and hardware. For instance, some embodiments may include a processor (e.g., CPU) that provides instructions and/or data to one or more of the logical units depicted in FIGS. 4A and 4B. The example single encoding engine 104 comprises a first processing unit 402 and a second processing unit 404. It should be understood within the context of the present disclosure that although two processing units 402 and 404 are shown, the quantity is merely illustrative, and that certain embodiments may include additional processing units. The multiple processing units 402 and 404 generate a respective bitstream (e.g., "bitstream 1" and bitstream 2") corresponding to different frame rates, picture sizes, and/or profiles and levels. For purposes of illustration, the single encoding engine 104 is shown as generating two bitstreams. However, some embodiments of the single encoding engine 104 may be expanded to generate any number of bitstreams. The number of bitstreams may depend, for example, on the application executing on the electronic appliance housing the encoding engine 104.

Video is received at video input 406 (e.g., an interface). For instance, the video received at the input to the interface 406 may comprise the input video 201 shown in FIG. 2A (or input video 209 shown in FIG. 2B). The interface 406 implements a duplication function according to well-known methods, where the input video is divided into plural video streams (in this example, two (2)) that mirror the frame rate (and/or profile/level) of the input video 201. The plural streams (e.g., such as input frame rate video 202 of FIG. 2A or input frame rate video 210 as depicted in FIG. 2B) are output from the interface 406 and provided to each processing unit 402 and 404. At the first processing unit 402, the input frame rate video 202 (210) is provided to coding decision logic that includes such coding decisions as intra-mode decision logic 408, where the determination of prediction directions for macroblocks in intra-prediction mode are made, and inter/intra decision logic 410 for processing a given macroblock. Also shown is motion estimation logic 412 (e.g., motion searching functionality) that includes partitioning of the macroblock and their motion vectors. The single encoding engine 104 further includes additional processing logic 438 and 440, which (referring to FIG. 4B) may include motion compensation logic 414, 424 for inter-prediction, where the partitions and their associated motion vectors to retrieve are identified by a motion estimation (search) logic 412.

As shown in FIG. 4A, another of the plural input frame rate video output by the interface 406 is provided to the second processing unit 404, and in particular, temporal scalar logic 436. The temporal scaler logic 436 performs frame rate conversion, and outputs a reduced frame rate video, such as reduced frame rate video 204 (FIG. 2A) or 212 (FIG. 2B). In some embodiments, the temporal scaler logic 436 may be omitted, such as in some embodiments involving the generation of multiple profiles and/or levels. In some embodiments, spatial scaling may also be employed. The reduced frame rate video is provided to additional processing logic 440, described below in conjunction with FIG. 4B. Video coding information includes motion vectors, motion vector search area, mode decisions, etc., and as explained above, is shared among the first and second processing units 402 and 404. In one embodiment, the motion vectors, motion vector search area, and/or mode decisions determined for the first processing unit 402 are provided to derivation logic 434.

In an embodiment where multiple picture rates are to be provided by the encoding engine 104, the derivation logic derives the motion vectors based on those motion vectors used in the first processing unit 402 and based on receiving (e.g., from temporal scalar logic 436, or in some embodiments from other logic, such as interface 406 or from a CPU) GOP and suitable reference picture determinations and their temporal distances to the current picture (e.g., where reference pictures present in the stream processed in the first processing unit 402 are absent or not in the second processing unit 404, and the temporal distance in the original video processed by 402 and that in the lower frame rate video processed by 404). In some embodiments corresponding to the provision of different picture rate streams, the intra prediction mode decision provided by the intra mode decision logic 408 is also shared between the high picture rate and low picture rate video stream (e.g., among first and second processing units 402 and 404 respectively) when the same intra picture is shared. The derivation logic 434 and temporal scaler logic 436 share information either directly or indirectly (e.g., via CPU intervention), as represented by the dashed line between 436 and 434. For instance, the temporal scaler logic 436 may pass information corresponding to frame rate and/or picture type to the derivation logic 434 (with or without processor intervention). As noted above, the temporal scaler logic 436 performs the temporal scaling to provide the reduced frame rate video (e.g., 204 or 212).

In an embodiment where there is a sharing of the motion vector search and mode decisions, such information is provided to the derivation logic 434 for use in encoding the reduced frame rate video stream 204 or 212.

In embodiments involving multiple profiles and levels, the first and second processing units 402 and 404 generate one or more compressed streams of different profiles and levels (with or without a reduced frame rate) in real-time by sharing the motion vector search result for inter-prediction and/or sharing intra mode decision for intra prediction, and/or the selection between inter or intra prediction for the macroblock or coding unit when encoding videos of different profiles and levels from the same input. The derivation logic 434 may determine whether to apply the common set of the motion vector range for all target AVC profiles and levels or apply a subset of the motion search results to the stream of lower profile when the motion search covers a larger range for the stream of higher profile. Such video coding information is used in encoding the video stream 204 or 212.

Although the various algorithms and/or methods are described as being performed at least in part in the derivation logic 434 in conjunction with the temporal scaler logic 436, it should be appreciated that one or more of the aforementioned functions may be performed by other logic or distributed among a plurality of different logic in some embodiments.

During the encoding process, a current frame or picture in a group of pictures (GOP) is provided for encoding. The current picture may be processed as macroblocks or coding units in the emerging video coding standard HEVC, where a macroblock or a coding unit corresponds to, for example, a 16×16 or 32×32 block of pixels in the original image. Each macroblock may be encoded in intra-coded mode or in inter-coded mode for P-pictures, or B-pictures. In inter-coded mode, the motion compensated prediction may be performed by the additional processing logic 438 and 440, such as corresponding motion compensation logic 414 and 424 (FIG. 4B) in each processing unit 402 and 404, respectively, and may be based on at least one previously encoded, reconstructed picture.

Referring to FIG. 4B and further explaining additional processing logic inside 438 and 440, for each processing unit 402, 404, the predicted macroblock P may be subtracted from the current macroblock to generate a difference macroblock by logic 416, 426 for each bitstream, and the difference macroblock may be transformed and quantized by the corresponding transformer/quantizer logic 418, 428 for each bitstream. The output of each transformer/quantizer logic 418, 428 may be entropy encoded by the corresponding entropy encoder logic 420, 430 and output as a compressed bitstream that corresponds to a different bitrate.

The encoded video bitstreams (e.g., "bitstream 1" and "bitstream 2") comprise the entropy-encoded video contents and any side information necessary to decode the macroblock. During the reconstruction operation for each of the bitstreams, the results from the corresponding transformer/quantizer logic 418, 428 may be de-quantized, inverse transformed, added to the prediction, and loop filtered by corresponding inverse quantizer/inverse transformer/reconstruction logic 418, 428 to generate a reconstructed difference macroblock for each bitstream.

In this regard, each bitstream is associated with a corresponding processing unit 402, 404 which include residual computation logic 416, 426, each configured to generate residuals and subsequently, the quantized transformed coefficients. Note, however, that different quantization parameters are applied. Each processing unit 402, 404 further comprises reconstruction logic 422, 432 coupled to the inverse quantizer/inverse transformer logic 418, 428, where each reconstruction logic 422, 432 is configured to generate corresponding reconstructed pixels. As shown, the reconstruction logic 422, 432 perform the reconstruction of decoded pixels at different frame rates and profiles and levels, depending on the corresponding quantization parameter that is applied. Note that one or more of the functionality involving the various logic described in association with FIGS. 4A and 4B may be combined into single logical units, or further distributed among additional logical units, or omitted in some embodiments.

Note that the various embodiments disclosed may be applied to various video standards, including but not limited to, MPEG-2, VC-1, VP8, and HEVC, which offers more encoding tools that may be shared. For example, with HEVC, the inter-prediction unit size can range anywhere from a block size of 4×4 up to 32×32, which requires a significant amount of data to perform motion search and mode decision.

Figure 5:
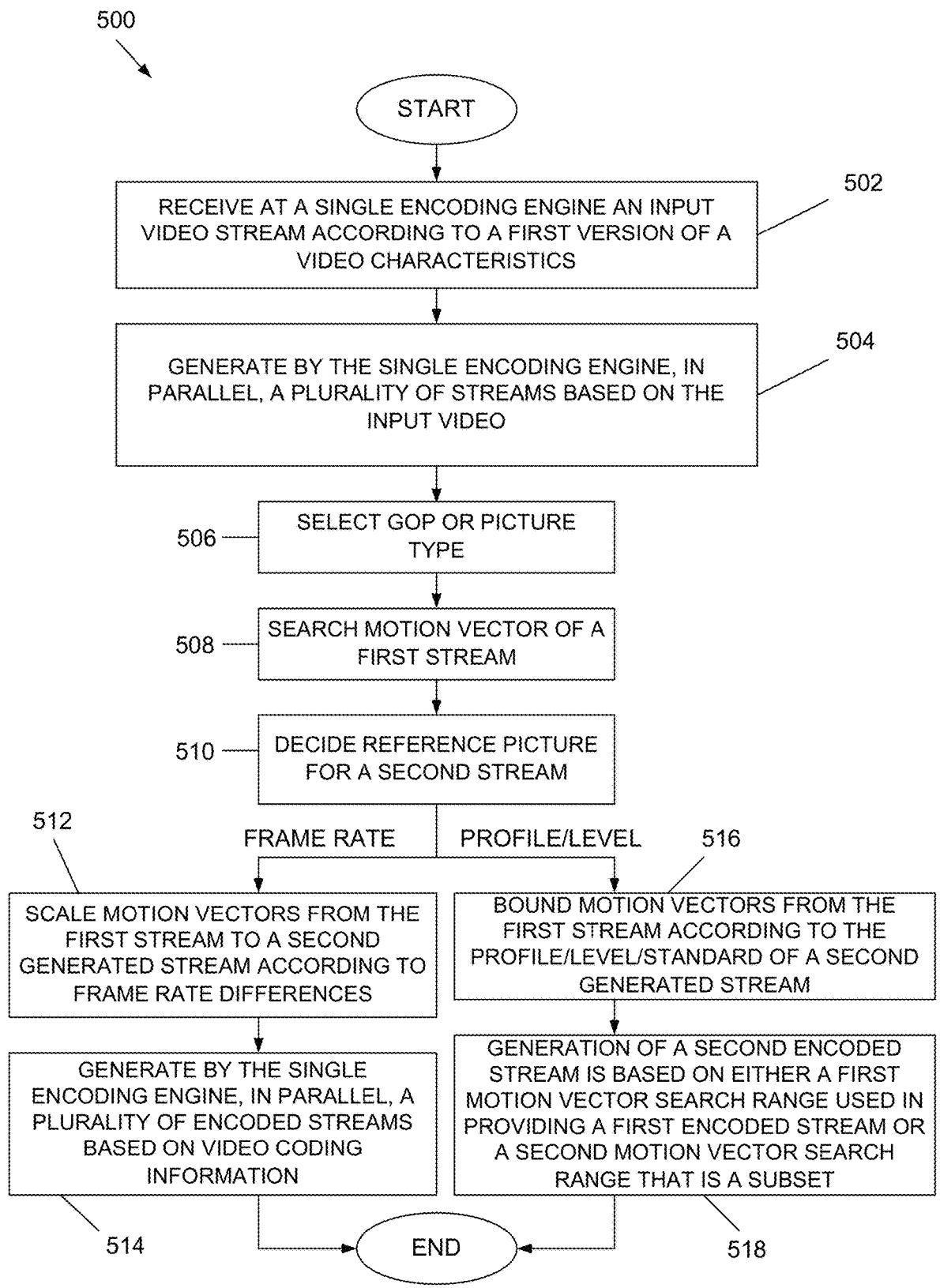
FIG. 5 is a flow diagram that illustrates one embodiment of an example video coding method.

It should be appreciated within the context of the present disclosure that one embodiment of a video coding method 500, depicted in FIG. 5 and implemented in one embodiment by a single encoding engine (e.g., 104), comprises, receiving at a single encoding engine an input video stream according to a first version of a video characteristics (502). For instance, the input video stream may be an uncompressed stream (e.g., input video stream 201 or 209, FIGS. 2A and 2B), and the video characteristic may be frame rate (picture rate), profile/level, and/or coding standard. The method 500 further comprises generating by the single encoding engine, in parallel, a plurality of streams based on the input video stream (504). For instance, the first and second streams generated include video streams 202 of FIG. 2A (or 210 of FIG. 2B) and 204 of FIG. 2A (or 212 of FIG. 2B). The method 500 further comprises selecting a GOP and/or picture type (506). For instance, the encoding engine 104 (e.g., in FIGS. 4A-4B, interface 406, temporal scaler logic 436, or a CPU in some embodiments) may determine the GOP and/or picture type.

The method 500 further comprises searching for motion vectors in a first generated stream, such as video streams 202, 210 (508). For instance, the first processing unit (e.g., motion estimation logic 412, FIGS. 4A-4B) may perform such a search in blocks of pictures of the first generated stream. The method 500 further comprises determining reference pictures for a second generated stream, such as the video stream 204 or 212 (510). In one embodiment, this latter function may be performed by the temporal scaler logic 436. Based on these determinations (506, 508, and 510), the method 500 scales motion vectors from the first stream to a second generated stream according to frame rate differences (512). The method 500 further comprises generating (in parallel) a plurality of encoded streams (including a reduced frame rate stream) based on video coding information (514). For instance, the plural streams may comprise a first encoded stream according to a first version of the video characteristic and a second encoded stream according to a second version of the video characteristic, such as lower frame rates, different profiles and levels, and/or standards. The second encoded stream is generated based on video coding information used to generate the first encoded stream, where the video coding information comprises motion vector search results and/or mode information. In some embodiments, a repeating or non-repeating pattern of pictures (e.g., open GOP) may be used. Accordingly, the second version may comprise a lower frame rate than the first version, and generating comprises generating the second encoded stream at the lower frame rate by deriving motion vectors from motion vectors used in generating the first encoded stream.

With regard to differences in profiles and levels, the method 500 bounds motion vectors from the first stream according to the profile/level/standard of a second generated stream (516), and the method 500 further comprises generation of the second encoded stream based on either a first motion vector search range used in the first encoded stream or a second motion vector search range that is a subset of the first motion vector search range, the first and second encoded streams provided based on a temporally common search operation (518). It should be appreciated within the context of the present disclosure that one or more of the above-described logical functions may be omitted in some embodiments, or additional logical functions may be included. For instance, sharing of mode information is also contemplated to be within the scope of certain embodiments of the method 500.

The video coding system may be implemented in hardware, software (e.g., including firmware), or a combination thereof. In one embodiment(s), the video coding system is implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In embodiments, where all or a portion of the video coding system is implemented in software, the software is stored in a memory and that is executed by a suitable instruction execution system (e.g., a computer system, including one or more processors, memory encoded with encoding software/firmware and an operating system, etc.).

Any process descriptions or blocks in flow diagrams should be understood as representing modules, segments, or portions of code which include one or more executable instructions for implementing specific logical functions or steps in the process, and alternate implementations are included within the scope of the disclosure in which functions may be executed out of order from that shown or discussed, including substantially concurrently or in reverse order, depending on the functionality involved, as would be understood by those reasonably skilled in the art.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method, comprising:
receiving, at a single encoding engine, an input video stream; and
generating, by the single encoding engine, in parallel, a plurality of streams comprising a first encoded stream according to a first version of profile and level and a second encoded stream according to a second version of the profile and level, the second encoded stream being generated using video coding information used to generate the first encoded stream, and the first version of the profile and level and the second version of the profile and level differing in either the profile, the level, or a combination of both the profile and the level,
wherein the generating of the second encoded stream comprises performing motion search on the second encoded stream using a luma bi-prediction size that is limited to a minimum luma bi-prediction size specified for the first encoded stream when the level of the profile and level associated with the second encoded stream is lower than a threshold level and the level of the profile and level associated with the first encoded stream is equal to or above the threshold level.

2. The method of claim 1, wherein the video coding information comprises motion vector search results used for inter prediction, the motion vector search results comprising motion vectors, partitions of one coding unit, motion vector search range, or any combination thereof, and
wherein the generation of the second encoded stream is based at least in part on either a first motion vector search range used in providing the first encoded stream or a second motion vector search range that is a subset of the first motion vector search range, the first and second encoded streams provided by using a temporally common search operation.

3. The method of claim 1, wherein the video coding information comprises a selection between inter or intra prediction for a given coding unit or an intra mode decision for intra prediction.

4. A system, comprising:
a single encoding engine configured to:
receive an input video stream; and
generate, in parallel, a first encoded stream having a first frame rate and a second encoded stream having a second frame rate from the input video stream, the first frame rate being higher than the second frame rate, wherein the generating of the second encoded stream comprises:
identifying a first Group of Pictures (GOP) associated with the first encoded stream and identifying a second GOP associated with the second encoded stream;
selecting a second picture from the second GOP, the selected second picture having a corresponding first picture in the first GOP;
determining that the corresponding first picture in the first GOP uses a first reference picture that is available in the first GOP and absent from the second GOP; and
responsive to the corresponding first picture in the first GOP using the first reference picture that is available in the first GOP and absent from the second GOP, deriving motion vectors for the selected second picture in the second GOP by scaling motion vectors associated with the corresponding first picture in the first GOP by:
identifying a first temporal distance between the corresponding first picture in the first GOP and a second reference picture which is preceding to the first reference picture that is available in the first GOP and absent from the second GOP, the second reference picture available in both the first GOP and the second GOP,
identifying a second temporal distance between the corresponding first picture in the first GOP and the first reference picture that is available in the first GOP and absent from the second GOP,
determining a factor corresponding to a ratio between the first temporal distance and the second temporal distance, and
scaling the motion vectors associated with the corresponding first picture in the first GOP to derive the motion vectors for the selected second picture in the second GOP using the determined factor.

5. The system of claim 4, wherein the single encoding engine is configured in hardware.

6. A method, comprising:
receiving, at a single encoding engine, an input video stream; and
generating, by the single encoding engine, in parallel, a plurality of streams comprising a first encoded stream having a first version of a video characteristic and a second encoded stream having a second version of the video characteristic, the first version of the video characteristic and the second version of the video characteristic differing in at least a value of the video characteristic,
wherein the second encoded stream is generated using video coding information used to generate the first encoded stream, the video coding information comprising a mode decision for inter prediction or intra prediction, and
wherein an intra prediction mode decision of each macroblock corresponding to the first encoded stream is used for the second encoded stream when a same intra picture is shared between the first encoded stream and the second encoded stream, the intra prediction mode decision of the respective macroblock comprising a determination of an intra prediction direction for the respective macroblock.

7. The method of claim 6,
wherein the video characteristic comprises frame rate, and
wherein the video coding information comprises motion vector search results used for inter prediction.

8. The method of claim 7, wherein the motion vector search results comprise motion vectors, partitions of one coding unit, motion vector search range, or any combination thereof.

9. The method of claim 7, wherein the second version comprises a lower frame rate than the first version, wherein the generating comprises generating the second encoded stream at the lower frame rate by sharing the motion vector search results applied in generating the first encoded stream, wherein the generating of the second encoded stream occurs without performing an additional motion search operation.

10. The method of claim 7, wherein the second version comprises a lower frame rate than the first version, wherein the generating comprises generating the second encoded stream at the lower frame rate by deriving motion vectors from motion vectors corresponding to the first encoded stream.

11. The method of claim 10, wherein the deriving uses a repeating pattern of pictures corresponding to the first encoded stream.

12. The method of claim 11, further comprising selecting an intra period of the repeating pattern of pictures to align the intra pictures of streams of different frame rates.

13. The method of claim 10, further comprising substituting a reference picture corresponding to the first encoded stream and unavailable for the second encoded stream with another reference picture,
wherein the deriving further comprises scaling the motion vectors corresponding to the first encoded stream based at least in part on differences in temporal distances between a current picture, the substitute reference picture, and the unavailable reference picture.

14. The method of claim 11, further comprising selecting an intra period of the repeating pattern of pictures to be a multiple of a temporal downscale factor.

15. The method of claim 7, wherein the first encoded stream comprises a combination of a base layer and an enhanced layer video stream, and the second encoded stream comprises only either a base layer or enhanced layer video stream, the motion vector search results corresponding to generation of the first encoded stream are used to generate motion vectors for the base layer video stream.

16. The method of claim 6, wherein partitions of the inter prediction corresponding to the second encoded stream are the same as partitions of the inter prediction corresponding to the first encoded stream.

17. The method of claim 10, wherein the deriving uses a non-repeating pattern of pictures corresponding to the first encoded stream.

* * * * *